United States Patent
Benson et al.

(10) Patent No.: US 6,992,129 B2
(45) Date of Patent: Jan. 31, 2006

(54) NON-HALOGENATED FLAME RETARDANT MATERIAL

(75) Inventors: Chris A. Benson, Palatine, IL (US); Tilak R. Varma, Grayslake, IL (US); Lawrence L. Lezon, Lake Zurich, IL (US)

(73) Assignee: Illinois Tool Works Inc., Glenview, IL (US)

( * ) Notice: Subject to any disclaimer, the term of this patent is extended or adjusted under 35 U.S.C. 154(b) by 153 days.

(21) Appl. No.: 10/696,962

(22) Filed: Oct. 30, 2003

(65) Prior Publication Data

US 2004/0170837 A1    Sep. 2, 2004

Related U.S. Application Data

(60) Provisional application No. 60/450,691, filed on Feb. 28, 2003.

(51) Int. Cl.
*C08K 3/34*    (2006.01)

(52) U.S. Cl. .................................... 524/445; 524/447

(58) Field of Classification Search ................ 524/445, 524/447
See application file for complete search history.

(56) References Cited

U.S. PATENT DOCUMENTS

| | | | |
|---|---|---|---|
| 5,204,393 A | 4/1993 | Nalepa et al. | 524/101 |
| 5,475,041 A | 12/1995 | Weil et al. | 524/100 |
| 5,849,827 A * | 12/1998 | Bodiger et al. | 524/423 |
| 6,632,442 B1 | 10/2003 | Chyall et al. | 424/400 |
| 6,797,760 B1 * | 9/2004 | Ebrahimian et al. | 524/445 |
| 2003/0209699 A1 | 11/2003 | Chyall et al. | 252/606 |

FOREIGN PATENT DOCUMENTS

| | | |
|---|---|---|
| EP | 0 531 110 A2 | 3/1993 |
| WO | WO 99/43747 | 9/1999 |
| WO | WO 01/10944 A1 | 2/2001 |
| WO | WO 03/006472 | 1/2003 |

* cited by examiner

*Primary Examiner*—Peter Szekely
(74) *Attorney, Agent, or Firm*—Mark W. Croll; Paul F. Donovan

(57) ABSTRACT

A flame retardant composition includes a polymeric base material, a non-halogenated flame retardant material and a synergist material present in a concentration of about 1 percent by weight of the composition. The synergist is substantially free from metal oxides. The flame retardant composition achieves a flammability rating of at least V-2 when tested in accordance with UL testing conditions.

10 Claims, No Drawings

NON-HALOGENATED FLAME RETARDANT MATERIAL

CROSS REFERENCE TO RELATED APPLICATION DATA

This application claims the benefit of priority of provisional U.S. Patent application Ser. No. 60/450,691, filed Feb. 28, 2003.

BACKGROUND OF THE INVENTION

The present invention is directed to a flame retardant material. More particularly, the present invention pertains to a flame retardant material that uses other than halogenated compounds to enhance the synergistic effects of flame retardancy.

Sheet materials are used in many applications as flame retardants or barriers. Often, in order to meet a specific need or application, these materials are fabricated into sheets or into other shapes to form a part of, or lie adjacent a structure or part of a structure for electrical cabinets containing electrical or electronic devices and the like. These materials can serve not only as a flame retardant, but can also serve as an electrical insulator.

Some known materials use polypropylene (as a homopolymer or as an ethylene polypropylene copolymer) as the "base" material with added flame retardants. Flame retardants include, for example, halogenated organic materials such as, for example, bis(2,3-dibromopropyl ether) of tetrabromobisphenol A, tetrabromobisphenol A-bis(2 hydroxyethyl ether), tetrabromobisphenol A-bis (allyl ether), hexabromocyclodecane, decabromodiphenyl oxide, octabromodiphenyl oxide, penta bromodiphenyl oxide, 2,4,6 tribromophenol, poly-dibromophenylene oxide, bis(tribromophenoxy) ethane, tetrabromophthalic anhydride or tetrabromophthalate diol. The halogenated flame retardant may be combined with a synergist so as to enhance the effectiveness of the halogenated organic flame retardant. The synergist may be a metal oxide such as, for example, antimony oxide or a salt such as, for example, sodium antimonate. The ratio of the halogenated organic flame retardant to the synergist is within the range of from approximately 2:1 to approximately 3:1. One exemplary material is disclosed in U.S. Pat. No. 5,521,003 to Lo et al., which patent is commonly assigned with the present application and is incorporated herein by reference.

While these materials work quite well for their intended purposes, e.g., flame retardancy and electrical insulation, they nevertheless contain halogenated materials and metal oxides, both of which have been found to be materials that should be avoided due to their potentially adverse environmental impact. However, even though these materials have some undesirable constituents, they nevertheless have certain advantageous and beneficial characteristics, such as the ability to be formed (typically by an extrusion process), which allows these materials to be readily shaped or fabricated into rigid flame retardant structures. As a result, other materials are sought that provide like functions and have like "forming" characteristics, but that have less or no severe environmental effects.

Accordingly, there exists a need for a readily extrudable or moldable flame retardant material. Desirably, such a material provides the flame retardancy characteristics of known, presently used materials, while reducing the amount of potentially environmentally hazardous materials. Most desirably, such a flame retardant material eliminates the need for halogenated compounds and metal oxides in the formulation.

BRIEF SUMMARY OF THE INVENTION

A flame retardant composition includes a polymeric base material, a non-halogenated flame retardant material and a synergist material, preferably a silicate having a particle size of less than 500 nanometers, present in a concentration of about 1 percent by weight of the composition. The synergist is substantially free from metal oxides. According to one aspect of the invention, the synergist is also substantially free from heavy metals. The flame retardant composition achieves a flammability rating of at least V-2 when tested in accordance with UL testing conditions.

A present composition provides the flame retardancy characteristics of known, presently used materials, but reduces the amount of potentially environmentally hazardous materials, such as halogenated materials and metal oxides. Desirable characteristics of such a material include ready extrudability or moldability.

These and other features and advantages of the present invention will be apparent from the following detailed description, in conjunction with the appended claims.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment described.

It should be further understood that the title of this section of this specification, namely, "Detailed Description Of The Invention", relates to a requirement of the United States Patent Office, and does not imply, nor should be inferred to limit the subject matter disclosed herein.

A present non-halogenated flame retardant composition or material includes low melt flow polypropylene combined with a complex salt and fine particle silicate to provide flame retardant characteristics more readily achieved with halogenated flame retardant materials. In a present non-halogenated flame retardant material, as set forth above, the base material is a low melt flow polypropylene homopolymer.

As will be recognized by those skilled in the art, a melt flow index of around 1.0 is acceptable for material for forming sheet products in, for example, an extrusion process. Higher melt flow indices are generally desirable for other forming processes (e.g., indices of about 12.0 for injection molding), and it is anticipated that the use of blends of polypropylene homopolymer and copolymers of ethylene and propylene can provide such properties, as well as other desired properties. It is also anticipated that such polymer blends can provide materials having properties that allow scoring and bending, without breaking or tearing, and importantly without sacrificing or compromising flame retardant properties.

In the present flame retardant material, the salt is an ethylene diamine phosphate and melamine flame retardant present in a concentration of about 30 to about 35 percent. A present flame retardant is available from Unitex Chemical Corporation of Greensboro, N.C. as product number FRX 44-94S.

The fine particle silicate has been found to provide a synergistic effect for the flame retardant. That is, a small amount of silicate allows a reduced flame retardant (e.g., salt) loading for the material. In a present flame retardant material, a fine particle, natural montmorillonite modified with a quaternary ammonium salt is used. One exemplary silicate or clay is available from Southern Clay Products, Inc. of Gonzales, Tex. under the trademark CLOISITE® 20A. The material is provided as a fine particle having a 90 percent particle size of less than 13 microns, a 5 percent particle size less than 6 microns and 10 percent less than 2 microns. As will be recognized by those skilled in the art, this clay is often referred to as a "nanoclay". In one embodiment, the clay has a particle size of 500 nanometers or less.

A preferred fire retardant material also includes an antioxidant. An exemplary antioxidant is a high molecular weight, low volatility material that prevents or slows the degradation of the base polymer (e.g., polypropylene) material. Such an antioxidant can also prevent or slow high temperature discoloration. A present antioxidant is a phenolic-based material, such as a tetrakismethylene (3,5-di-t-butyl-4-hydroxyhydrocinnamate)- methane, commercially available from Great Lakes Chemical Corporation of Indianapolis, Ind. under product name Anox 20. The flame retardant material can also include a metal (e.g., copper) deactivator, such as 3-(N-salicyloyl)amino-1,2,3 triazole, commercially available from Amfine Chemical Corporation of Allendale, N.J. under product name CDA-1.

It has been found that the use of the clay facilitates reduction of the amount, i.e., weight percent, of flame retardant (e.g., salt) necessary to achieve the desired material characteristics. In a present material, the polypropylene "base" material is present in a concentration of about 60 percent to about 70 percent by weight, the flame retardant (e.g., salt) is present in a concentration of about 25 percent to about less than 45 percent, and preferably about 30 percent to 35 percent, and the clay is present in a concentration of about 1 percent by weight. This is in contrast to other non-halogenated systems which typically require flame retardant material loadings of about 60 percent, and phosphorous-based intumescent systems that typically require about 45 percent loadings.

Various formulations of the present flame retardant material were subjected to flame tests to determine the efficacy of the material under conditions specified by Underwriter's Laboratories (UL), namely UL 94 ratings. Three formulations were tested. A first formulation which is labeled "Blend 2", had the flame retardant (e.g., the FRX material) present in a concentration of 35 percent, but did not have the clay material present. The second formulation, which is labeled "Blend 4" had the flame retardant material present in a concentration of 30 percent and the nanoclay present in a concentration of 1 percent. The third formulation, labeled "Blend 5" had the flame retardant present in a concentration 30 percent and a char promoter present in a concentration of 1 percent. (The char promoter is also commercially available from Unitex Chemical as product number 5066).

Each of the formulations also included an antioxidant (Anox 20) present in a concentration of 1 percent and a metal deactivator (CDA-1) present in a concentration of 0.30 percent. Polypropylene homopolymer constituted the remainder of the material (i.e., in Blends 1 and 2, polypropylene was present in a concentration of 63.7 percent in Blend 2 and in Blends 4 and 5, in a concentration of 67.7 percent). Table 1 below provides in tabular form, the constituents of the Blends.

TABLE 1

NON-HALOGENATED FIRE RETARDANT POLYPROPYLENE FORMULATIONS

| RAW MATERIAL | WEIGHT, LBS. | WEIGHT % |
|---|---|---|
| Blend 2 | 35% FRX | |
| Homopolymer PP | 637 | 63.70% |
| FRX 44-94S | 350 | 35% |
| Char Promoter 5066 | 0 | 0% |
| Cloisite 20A, Nanoclay | 0 | 0% |
| Adk Stab CDA-1 | 3 | .30% |
| Annox 20 | 10 | 1% |
| Total | 1000 | 100.00% |
| Blend 4 | 30% FRX and 1% Nanoclay | |
| Homopolymer PP | 338.50 | 67.70% |
| FRX 44-94S | 150.0 | 30.00% |
| Char Promoter 5066 | 0.0 | 0.00% |
| Cloisite 20A, Nanoclay | 5.0 | 1.00% |
| Adk Stab CDA-1 | 1.5 | 0.30% |
| Annox 20 | 5.0 | 1.00% |
| Total | 500 | 100.00% |
| Blend 5 | 30% FRX and 1% Char Promoter | |
| Homopolymer PP | 338.50 | 67.70% |
| FRX 44-94S | 150.0 | 30.00% |
| Char Promoter 5066 | 5.0 | 1.00% |
| Cloisite 20A, Nanoclay | 0.0 | 0.00% |
| Adk Stab CDA-1 | 1.5 | 0.30% |
| Annox 20 | 5.0 | 1.00% |
| Total | 500 | 100.00% |

As set forth above, samples material of each of the Blends were tested using UL specified conditions to determine the efficacy of clay inclusion and concomitant fire retardant (salt) reduction. The samples were suspended from a clamp and a flame was held under the sample for a period of ten seconds for the first burn. The flame was then removed and then held under the sample for a second period of ten seconds for the second burn, in accordance with UL Standard 94.

The results of the testing are shown as: zero (0) indicating that the sample immediately self extinguished; a specified period of time indicating that the sample continued to burn for that period of time; or CI indicating that the sample "dripped" and ignited a cotton pad below the sample. The term AB is used to indicate that the "time" was after burn, that is that the sample continued to burn for the indicated period of time.

The results of the testing are shown below in Tables 2–4. The data in Table 2 represents the flammability testing of Blend 2 in the transverse direction and in the machine direction. The transverse direction shows results for samples that were held in the clamp in an orientation transverse to the direction in which the sheets were extruded from an extruder. Conversely, the machine direction shows the results for samples that were oriented during testing in the same direction as that in which the sheets were extruded from the extruder. The samples of Blend 2 were tested at a sample size of 0.027 inches thick and 0.50 inches wide. The samples of the Blend 4 materials were tested at two different sizes, 0.027 inches thick and 0.50 inches wide (Table 3A) and 0.015 inches thick and 0.50 inches wide (Table 3B). The samples of the Blend 5 materials were tested at two different sizes, 0.015 inches thick and 0.50 inches wide (Table 4A) and 0.057 inches thick and 0.50 inches wide (Table 4B).

TABLE 2

BLEND 2 FLAMMABILITY TEST RESULTS

|  | First Burn | Second Burn | Comments |
|---|---|---|---|
| Transverse Direction | | | |
| 1 | 5 sec AB | CI @ 6 sec | SE, CI |
| 2 | 5 sec AB | CI @ 6 sec | SE, CI |
| 3 | 4 sec AB | CI @ 6 sec | SE, CI |
| 4 | 1 sec AB | CI @ 6 sec | SE, CI |
| 5 | 1 sec AB | CI @ 6 sec | SE, CI |
| Machine Direction | | | |
| 1 | 0 | CI @ 2 sec | SE, CI |
| 2 | 0 | CI @ 3 sec | SE, CI |
| 3 | 1 sec AB | CI @ 3 sec | SE, CI |
| 4 | 0 | CI @ 4 sec | SE, CI |
| 5 | 0 | CI @ 1 sec | SE, CI |

TABLE 3A

BLEND 4 FLAMMABILITY TEST RESULTS, SAMPLE AT 0.027 INCHES THICK AND 0.5 INCHES WIDE

|  | First Burn | Second Burn | Comments |
|---|---|---|---|
| Transverse Direction | | | |
| 1 | 1 sec AB | CI @ 5 sec | SE, CI |
| 2 | 1 sec AB | CI @ 5 sec | SE, CI |
| 3 | 1 sec AB | CI @ 5 sec | SE, CI |
| 4 | 0 | CI @ 5 sec | SE, CI |
| 5 | 0 | CI @ 7 sec | SE, CI |
| Machine Direction | | | |
| 1 | 0 | CI @ 9 sec | SE, CI |
| 2 | 0 | CI @ 9 sec | SE, CI |
| 3 | 0 | CI @ 10 sec, 2 sec AB | SE, CI |
| 4 | 0 | CI @ 10 sec, 2 sec AB | SE, CI |
| 5 | 0 | CI @ 10 sec, 2 sec AB | SE, CI |

TABLE 3B

BLEND 4 FLAMMABILITY TEST RESULTS, SAMPLE AT 0.015 INCHES THICK AND 0.5 INCHES WIDE

|  | First Burn | Second Burn | Comments |
|---|---|---|---|
| Transverse Direction | | | |
| 1 | 0 | CI @ 5 sec | SE, CI |
| 2 | 1 sec AB | CI @ 3 sec | SE, CI |
| 3 | 0 | CI @ 2 sec | SE, CI |
| 4 | 3 sec AB, CI | N/A | SE, CI |
| 5 | 0 | CI @ 5 sec | SE, CI |
| Machine Direction | | | |
| 1 | 1 sec AB | CI @ 5 sec | SE, CI |
| 2 | 1 sec AB | CI @ 4 sec | SE, CI |
| 3 | 2 sec AB | CI @ 3 sec | SE, CI |
| 4 | 2 sec AB | CI @ 1 sec, 2 sec AB | SE, CI |
| 5 | 1 sec AB | CI @ 4 sec | SE, CI |

TABLE 4A

BLEND 5 FLAMMABILITY TEST RESULTS, SAMPLE AT 0.015 INCHES THICK AND 0.5 INCHES WIDE

|  | First Burn | Second Burn | Comments |
|---|---|---|---|
| Transverse Direction | | | |
| 1 | 0 | CI @ 6 sec | SE, CI |
| 2 | 3 sec AB | CI @ 6 sec | SE, CI |
| 3 | 3 sec AB | CI @ 6 sec | SE, CI |
| 4 | 2 sec AB | CI @ 6 sec | SE, CI |
| 5 | 2 sec AB | CI @ 6 sec | SE, CI |
| Machine Direction | | | |
| 1 | 1 sec AB | CI @ 9 sec, 1 sec AB | SE, CI |
| 2 | 0 | 0 | SE |
| 3 | 1 sec AB | CI @ 5 sec, 3 sec AB | SE, CI |
| 4 | 0 | CI @ 6 sec, 2 sec AB | SE, CI |
| 5 | 1 sec AB | CI @ 8 sec, 1 sec AB | SE, CI |

TABLE 4B

BLEND 5 FLAMMABILITY TEST RESULTS, SAMPLE AT 0.057 INCHES THICK AND 0.5 INCHES WIDE

|  | First Burn | Second Burn | Comments |
|---|---|---|---|
| Transverse Direction | | | |
| 1 | 0 | 0 | SE |
| 2 | 0 | 1 sec AB | SE |
| 3 | 0 | 0 | SE |
| 4 | 0 | 3 sec AB | SE |
| 5 | 1 sec AB | 0 | SE |
| Machine Direction | | | |
| 1 | 0 | 2 sec AB | SE |
| 2 | 0 | 2 sec AB | SE |
| 3 | 0 | 1 sec AB | SE |
| 4 | 0 | 0 | SE |
| 5 | 0 | 1 sec AB | SE |

As can be seen from the results of the data, 35 percent blends (Blend 2), and even the 30 percent blends (Blends 4 and 5) that included a 1 percent concentration of nanoclay, achieved a UL V-2 flammability rating (that is, burning stopped within 30 seconds on a vertical specimen; drips of flaming particles were allowed). This is quite unexpected in that prior known flame retardant materials required flame retardant (e.g., salt) loadings of about 45 percent to achieve these same flammability testing results.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A non-halogenated flame retardant composition comprising:
   a polypropylene polymer base material;
   a non-halogenated phosphate salt flame retardant material present in a concentration of about 25 percent to no less than about 45 percent by weight of the composition; and
   a synergist material present in a concentration of about 1 percent by weight of the composition, the synergist being free from heavy metals, the synergist material being a clay,
   wherein the flame retardant composition achieves a flammability rating of at least V-2 when tested in accordance with UL testing conditions.

2. The non-halogenated flame retardant composition in accordance with claim 1 wherein the polypropylene is a homopolymer.

3. The non-halogenated flame retardant composition in accordance with claim 1 wherein the clay is a nanoclay.

4. The non-halogenated flame retardant composition in accordance with claim 1 wherein the clay has a particle size of 500 nanometers or less.

5. A non-halogenated flame retardant composition comprising:
   a polypropylene base material present in a concentration of about 60 percent to about 70 percent by weight of the composition;
   a non-halogenated phosphate salt flame retardant material present in a concentration of about 30 percent to about 35 percent by weight of the composition; and
   a synergist material present in a concentration of about 1 percent by weight of the composition, the synergist being free from heavy metals, the synergist material being a clay,
   wherein the flame retardant composition achieves a flammability rating of at least V-2 when tested in accordance with UL testing conditions.

6. The non-halogenated flame retardant composition in accordance with claim 5 wherein the polypropylene is a homopolymer of polypropylene.

7. The non-halogenated flame retardant composition in accordance with claim 5 wherein the clay is a nanoclay.

8. The non-halogenated flame retardant composition in accordance with claim 5 wherein the clay has a particle size of 500 nanometers or less.

9. A non-halogenated flame retardant composition comprising:
   a polypropylene base material present in a concentration of about 60 percent to about 70 percent by weight of the composition;
   a phosphate salt non-halogenated flame retardant material present in a concentration of about 30 percent to about 35 percent by weight of the composition; and
   a clay material synergist present in a concentration of about 1 percent by weight of the composition, the clay material synergist being free from heavy metals,
   wherein the flame retardant composition achieves a flammability rating of at least V-2 when tested in accordance with UL testing conditions.

10. The non-halogenated flame retardant composition in accordance with claim 9 wherein the polypropylene base material is present in a concentration of about 68 percent by weight of the composition, to phosphate salt non-halogenated flame retardant material is present in a concentration of about 30 percent by weight of the composition and the clay material synergist is present in a concentration of about 1 percent by weight of the composition.

* * * * *